US012779891B2

(12) United States Patent
Egginger et al.

(10) Patent No.: US 12,779,891 B2
(45) Date of Patent: Nov. 3, 2026

(54) METHOD FOR PRODUCING A SECURITY FEATURE

(71) Applicants: Hueck Folien Gesellschaft m.b.H., Baumgartenberg (AT); BANQUE DE FRANCE, Paris (FR)

(72) Inventors: Martin Egginger, Linz (AT); Martin Bergsmann, Linz (AT); Marco Mayrhofer, Baumgartenberg (AT)

(73) Assignees: Hueck Folien Gesellschaft m.b.H., Baumgartenberg (AT); BANQUE DE FRANCE, Paris (FR)

( * ) Notice: Subject to any disclaimer, the term of this patent is extended or adjusted under 35 U.S.C. 154(b) by 0 days.

(21) Appl. No.: 17/283,083

(22) PCT Filed: Nov. 8, 2019

(86) PCT No.: PCT/AT2019/060379
§ 371 (c)(1),
(2) Date: Apr. 6, 2021

(87) PCT Pub. No.: WO2020/093080
PCT Pub. Date: May 14, 2020

(65) Prior Publication Data

US 2021/0379914 A1 Dec. 9, 2021

(30) Foreign Application Priority Data

Nov. 9, 2018 (AT) .............................. A 50964/2018

(51) Int. Cl.
*B41M 3/14* (2006.01)
*B41M 1/10* (2006.01)
(Continued)

(52) U.S. Cl.
CPC .............. *B41M 3/144* (2013.01); *B41M 1/10* (2013.01); *B42D 25/29* (2014.10); *B42D 25/387* (2014.10); *B42D 25/405* (2014.10)

(58) Field of Classification Search
CPC ......... B41M 3/144; B41M 1/10; B42D 25/29; B42D 25/387; B42D 25/405
See application file for complete search history.

(56) References Cited

U.S. PATENT DOCUMENTS 4,066,280 A 1/1978 Lacapria
4,721,635 A * 1/1988 Helinski .................. B41M 1/18 427/256
(Continued)

FOREIGN PATENT DOCUMENTS

CA 2 642 330 A1 8/2007
CN 104123572 A 10/2014
(Continued)

OTHER PUBLICATIONS

International Search Report in PCT/AT2019/060379, mailed Feb. 14, 2020.
(Continued)

*Primary Examiner* — Stephen D Meier
*Assistant Examiner* — Quang X Nguyen
(74) *Attorney, Agent, or Firm* — Collard & Roe, P.C.

(57) ABSTRACT

The invention relates to a method for producing a security feature (1) in the form of a colored image (2), a colorant being applied to a substrate (3) to produce the image, the image (2) being subdivided into grid areas, immediately adjacent grid areas (4, 5, 6, 9, 10, 11) of the image (2) partially overlapping, an overlapping area (7, 8) of immediately adjacent grid areas (4, 5, 6, 9, 10, 11) being smaller than one of the grid areas (4, 5, 6, 9, 10, 11), grid areas (4, 5, 6, 9, 10, 11) of the image (2) being each assigned at least
(Continued)

one color, and at least the areas of the substrate (3) corresponding to the respective grid areas (4, 5, 6, 9, 10, 11) minus the corresponding overlapping areas (7, 8) being covered with at least one colorant of the respectively assigned color, the overlapping areas (7, 8) between adjacent grid areas (4, 5, 6, 9, 10, 11) being covered at least with the colorant having the color assigned to one of the grid areas (4, 5, 6, 9, 10, 11) overlapping in the respective overlapping areas (7, 8).

29 Claims, 1 Drawing Sheet

(51) Int. Cl.

| | |
|---|---|
| ***B42D 25/29*** | (2014.01) |
| ***B42D 25/387*** | (2014.01) |
| ***B42D 25/405*** | (2014.01) |

(56) References Cited

U.S. PATENT DOCUMENTS

| | | | | |
|---|---|---|---|---|
| 4,897,300 | A | 1/1990 | Boehm | |
| 5,733,634 | A | 3/1998 | Karel | |
| 6,598,523 | B1 | 7/2003 | Kinoshita et al. | |
| 7,196,815 | B2 | 3/2007 | Epple | |
| 8,100,436 | B2 | 1/2012 | Heine et al. | |
| 9,757,972 | B2 | 9/2017 | Peinze et al. | |
| 10,508,208 | B2 | 12/2019 | Clauter et al. | |
| 10,818,098 | B2 | 10/2020 | Tanaka | |
| 11,014,390 | B2 | 5/2021 | Aoyama et al. | |
| 2001/0005212 | A1 | 6/2001 | Otsuki | |
| 2004/0209096 | A1 | 10/2004 | Brehm et al. | |
| 2008/0259400 | A1 | 10/2008 | Hersch et al. | |
| 2009/0250920 | A1 * | 10/2009 | Isherwood | D21H 21/42 283/110 |
| 2014/0168428 | A1 | 6/2014 | Nefedov et al. | |
| 2016/0303889 | A1 | 10/2016 | Gutmann et al. | |
| 2017/0259600 | A1 | 9/2017 | Aoyama et al. | |
| 2019/0126660 | A1 * | 5/2019 | Dorier | C09D 11/033 |

FOREIGN PATENT DOCUMENTS

| | | | | |
|---|---|---|---|---|
| CN | 104781088 | A | | 7/2015 |
| CN | 107148357 | A | | 9/2017 |
| CN | 108335358 | A | | 7/2018 |
| CN | 108367584 | A | | 8/2018 |
| CN | 108538187 | A | | 9/2018 |
| DE | 10 2005 011 612 | A1 | | 2/2006 |
| DE | 10 2006 006 501 | A1 | | 8/2007 |
| DE | 10 2012 218 615 | A1 | | 4/2014 |
| EP | 0 303 725 | A1 | | 2/1989 |
| EP | 1 237 354 | A2 | | 9/2002 |
| EP | 1 985 458 | A1 | | 10/2008 |
| EP | 1 997 642 | A2 | | 12/2008 |
| EP | 2 079 227 | A1 | | 7/2009 |
| EP | 3 225 417 | A1 | | 10/2017 |
| EP | 3 248 806 | A1 | | 11/2017 |
| EP | 3 328 049 | A1 | | 5/2018 |
| EP | 3 513 984 | A1 | | 7/2019 |
| GB | 2 542 786 | B | | 2/2018 |
| JP | H05-31980 | U | | 4/1993 |
| JP | H07-125403 | A | | 5/1995 |
| JP | H08-320047 | A | | 12/1996 |
| JP | 2002-103779 | A | | 4/2002 |
| JP | 2003063094 | A | * | 3/2003 |
| JP | 2008-001075 | A | | 1/2008 |
| JP | 2010-241056 | A | | 10/2010 |
| JP | 2012-223901 | A | | 11/2012 |
| JP | 2014-204408 | A | | 10/2014 |
| JP | 2015-120304 | A | | 7/2015 |
| KR | 20090021391 | A | | 3/2009 |
| KR | 20170029791 | A | | 3/2017 |
| RU | 2502842 | C1 | | 12/2013 |
| WO | 00/09343 | A1 | | 2/2000 |
| WO | 03/011606 | A1 | | 2/2003 |
| WO | 2007/093300 | A2 | | 8/2007 |
| WO | 2011/104331 | A1 | | 9/2011 |
| WO | 2014/076245 | A1 | | 5/2014 |
| WO | 2016/124315 | A1 | | 8/2016 |
| WO | 2017/003351 | A | | 1/2017 |
| WO | 2016/111334 | A1 | | 7/2017 |
| WO | 2017/190831 | A1 | | 11/2017 |

OTHER PUBLICATIONS

"Einführung in die Rastertechnologie" [Introduction to Raster Technology], Heidelberger Druckmaschinen AG, 2007, with English translation.

Annex A1, Characteristic classification of claims 1 and 11 by Geyer, Fehners & Partner, with English translation (Sep. 28, 2023).

* cited by examiner

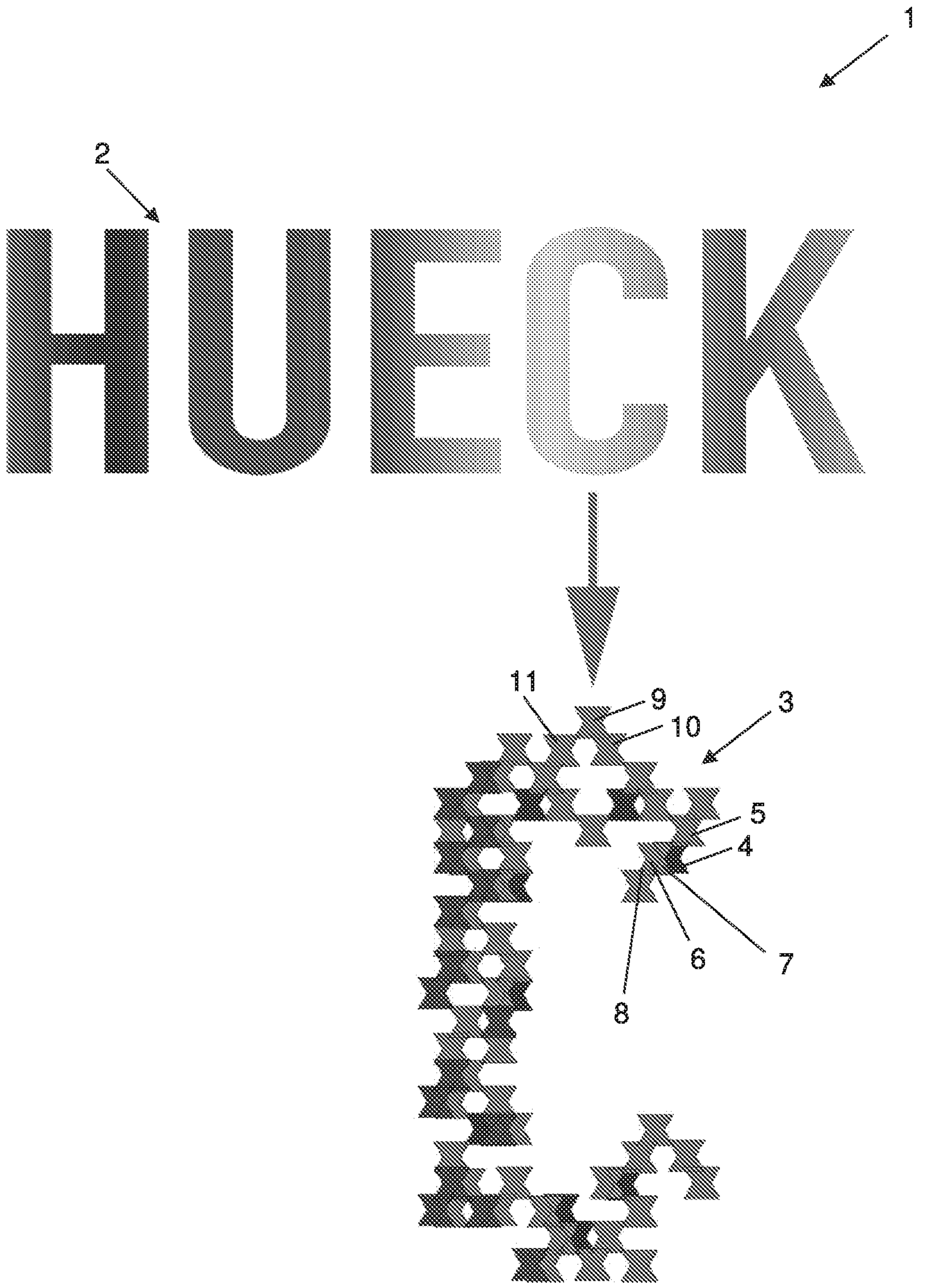
1
2
HUECK
11
9
10
3
5
4
6
7
8

METHOD FOR PRODUCING A SECURITY FEATURE

CROSS REFERENCE TO RELATED APPLICATIONS

This application is the National Stage of PCT/AT2019/060379 filed on Nov. 8, 2019, which claims priority under 35 U.S.C. § 119 of Austrian Application No. A50964/2018 filed on Nov. 9, 2018, the disclosure of which is incorporated by reference. The international application under PCT article 21(2) was not published in English.

BACKGROUND OF THE INVENTION

1. Field of the Invention

The invention relates to a method of producing a security feature in the form of a colored image, wherein a colorant is applied to a substrate to produce the image.

Furthermore, the invention relates to a security feature in the form of a colored image.

In addition, the invention has as an object a security element, in particular in the form of a security strip.

In addition, the invention relates to a value document.

2. Description of the Related Art

A method and a security element of the above-mentioned type have become known from WO2007/09330012A2. Another security element, in which a complete overlap of adjacent grid areas is realized, has become known from EP3255417A1. EP0303725A1 and EP 3248806 A1 relate to a security paper that has partially overlapping luminescent colors that are not visible under normal illumination.

When security features are produced using printing processes based on the CMYK color model, the colors are usually applied over the entire surface, resulting in subtractive color mixing. However, these printing processes are not suitable for implementing additive color mixing. In particular, when fluorescent inks are used, known printing processes based on full-surface overlapping of the ink layers lead to problems in the realization of colored images, since full-surface overlapping of the primary colors red, green and blue in the case of fluorescent colorants results in a gray overall impression. When only two fluorescent colors are used, on the other hand, one of the two colors is usually perceived more strongly than the other. With the known methods, it is therefore not possible to display colored images, for example in the form of portraits, landscapes, alphanumeric characters, etc., with fluorescent colors. The display of fluorescent rainbows is an established technique. Until now, rainbows have been produced using three block-strip cylinders that print in an overlapping manner to generate a color gradient in the form of a rainbow. However, it is not possible to display texts or individual letters or characters in the rainbow colors with the existing solutions.

SUMMARY OF THE INVENTION

It is therefore an object to overcome the above-mentioned disadvantages of the prior art and to improve the production of security features with colored images.

The above-mentioned object is solved with a method of the type mentioned at the beginning by the features according to one aspect of the invention.

The solution according to the invention enables the production of security features with colored images in a simple manner, even when fluorescent inks are used, since the only partial overlapping of the grid areas enables additive color mixing with luminous colorants. By varying the overlapping area of adjacent grid areas, the intensity of the color impression at this point can be optimally adjusted so that the desired overall optical impression is achieved. The solution according to the invention can also be used to provide a rainbow display with designs, for example, non-fluorescent text, opposite rainbow, white text etc.

According to an advantageous variant of the invention, it may be provided that the image is divided in at least one partial area into at least two partially overlapping grid areas, at least one of the at least two grid areas being covered, at least outside the overlapping area, with a colorant having a color different from the color of the colorant covering the other of the at least two grid areas.

Arbitrary colored images can be produced by covering part of the grid areas at least partially with red color and part of the grid areas of the image at least partially with green color and part of the grid areas of the image at least partially with blue color.

According to an advantageous further embodiment of the invention, which is particularly suitable for production by means of an intaglio printing process, it may be provided that the grid areas are of the same size and shape.

In order to achieve optimum additive color mixing, fluorescent colorants, in particular a colorant that fluoresces in UV light can be used as colorants.

Particularly high luminosity and coverage can be achieved by transferring the colorant to the substrate using an intaglio printing process.

At least one character, in particular an alphanumeric character and/or icon and/or geometric figure and/or symbol, or a sequence of characters may be applied to produce the image.

The colorants can be applied overlapping in layers so that at least one sequence of colors in the image corresponds to the sequence of colors of a rainbow or a multicolor gradient.

According to a variant of the invention, a colored area may be at least partially generated around at least one character or the at least one sequence of characters by applying one or more colorants to grid areas surrounding the character.

Further, a sequence of colors in the at least one character or in the at least one sequence of characters may be applied in the opposite direction to a sequence of colors in the colored area.

The above-mentioned object can also be solved with a security feature of the type mentioned at the beginning by the features according to another aspect of the invention.

Preferably, an image comprises, at least in a partial area, at least two overlapping grid areas, at least one of the grid areas being covered, at least outside the overlapping area, with a colorant having a color different from that of the colorant covering the other of the at least two grid areas.

The realization of images of any color is favored by the fact that part of the grid areas of the image is at least partially covered with red color, and part of the grid areas of the image is at least partially covered with green color, and part of the grid areas of the image is at least partially covered with blue color.

According to an advantageous variant of the invention, it may be provided that the grid areas forming the image are of the same size and shape.

It has been found to be particularly advantageous that an overlapping area of two adjacent grid areas of the image is between 1 and 90% with respect to the size of a grid area.

A preferred variant of the invention is that the colorant is a fluorescent colorant, in particular a colorant that fluoresces in UV light.

The image is preferably a portrait, a landscape, an abstract geometric sign, a logo or an alphanumeric character, or a coding.

In addition, a colored area can be arranged at least partially around the at least one character or the at least one sequence of characters.

A sequence of colors in which at least one character or in which at least one sequence of characters is included may be applied in the opposite direction to a sequence of colors in the colored area.

According to a variant of the invention, the colorants may be applied overlapping in layers so that at least one sequence of colors in the image corresponds to the sequence of colors of a rainbow or a multicolor gradient.

The object of the invention is also solved by a security element, in particular in the form of a security strip, which has a security feature according to other aspects of the invention.

The object mentioned at the beginning can also be solved by a value document comprising a security element according to a further aspect of the invention and/or a security feature according to other aspects of the invention.

BRIEF DESCRIPTION OF THE DRAWINGS

For a better understanding of the invention, it is explained in more detail with reference to the following FIGURE.

It shows in a highly simplified, schematic representation:

FIG. 1 security feature according to the invention.

DETAILED DESCRIPTION OF THE PREFERRED EMBODIMENTS

By way of introduction, it should be noted that in the differently described embodiments, the same parts are provided with the same reference signs or the same component designations, whereby the disclosures contained in the entire description can be transferred mutatis mutandis to the same parts with the same reference signs or the same component designations. Also, the positional indications selected in the description, such as top, bottom, side, etc., are related to the immediately described as well as depicted FIGURE, and these positional indications are to be transferred mutatis mutandis to the new position in the event of a change of position.

All indications of value ranges in the present description are to be understood as including any and all subranges thereof, e.g. the indication 1 to 10 is to be understood as including all subranges starting from the lower limit 1 and the upper limit 10, i.e. all subranges starting with a lower limit of 1 or greater and ending with an upper limit of 10 or less, e.g. 1 to 1.7, or 3.2 to 8.1, or 5.5 to 10.

According to FIG. 1, a security feature 1 according to the invention has the form of a colored image 2, for example in the form of a portrait, a landscape, a building, an abstract geometric character, a logo or an alphanumeric character 3, or a sequence of characters, etc. The security feature 2 is applied to a substrate, for example a security strip or immediately to a value document.

The image 2 is divided into grid areas 4, 5, 6, 9, 10, 11. The grid areas 4, 5, 6, 9, 10, 11 forming the image 2 can be of the same size and shape. Deviating from the shape shown here, the grid areas 4, 5, 6, 9, 10, 11 may have a triangular, square or polygonal contour. Thus, the contours of the grid surfaces 4, 5, 6, 9, 10, 11 can be formed in particular by triangles, rectangles, parallelograms, trapezoids, deltoids, hexagons, octagons, or any polygons.

It can be seen from the illustration that adjacent grid areas 4, 5, 6, 9, 10, 11 of the image 2 partially overlap, wherein an overlapping area 7, 8 of two adjacent grid areas 4, 5, 6, 9, 10, 11 is smaller than each of the grid areas 4, 5, 6, 9, 10, 11 per se. An overlapping area of two adjacent grid areas 4, 5, 6, 9, 10, 11 of the image 2 is preferably between 1 and 90%, in particular between 3 and 80%, particularly preferably between 1-25% or 5-10%, with respect to the size of a grid area 4, 5, 6, 9, 10, 11.

According to FIG. 1, each grid area 4, 5, 6, 9, 10, 11 of the image 2 is covered with a colorant of a color associated with the respective grid area at least outside the overlapping areas 7, 8 to its adjacent grid areas 4, 5, 6, 9, 10, 11.

Here, a partial area of the grid areas 4, 5, 6, 9, 10, 11 can be differently colored. Each of the grid areas 4, 5, 6, 9, 10, 11 can be single-colored outside the overlapping areas 7, 8 to the adjacent grid cells. In an overlapping area 7, 8, for example, that colorant can be applied which corresponds in color to the colorant of one of the overlapping grid areas 4, 5, 6, 9, 10, 11 outside the overlapping area 7, 8. In this embodiment, the overlapping area 7, 8 is thus covered with only one colorant layer, which corresponds to that covering one of the adjacent grid areas 4, 5, 6, 9, 10, 11. Thus, the grid area 5 outside the overlapping area 7 can be completely green, while the overlapping area 7 and the grid area 6 can be completely covered with a colorant of blue color.

Alternatively, however, each grid area 4, 5, 6, 9, 10, 11 can be covered individually over its entire surface with a colorant of one color, with layers of the different colorants coming to lie on top of one another in an overlapping area of the grid areas 4, 5, 6, 9, 10, 11. For example, the first grid area 4 can be covered with red color over its entire surface, the second grid area 5 can be covered with green color over its entire surface, and the third grid area 6 can be covered with blue color. In an overlapping area of the three grid areas 4, 5, 6, the layer structure is thus red-green-blue, depending on the sequence in which the colorant is applied.

In other partial areas of the image 2, however, adjacent grid areas 9, 10, 11 can be covered with the same color, for example blue, red or green.

The preferred colorant is a fluorescent colorant, in particular a colorant that fluoresces in UV light. Inks with fluorescent pigments, for example, have proven to be particularly suitable.

To produce the security feature 1 shown in FIG. 1, the image 2 is created by applying colorant to the substrate. The image 2 is divided into grid areas 4, 5, 6, 9, 10, 11. Adjacent grid areas 4, 5, 6, 9, 10, 11 partially overlap each other, wherein the size of the overlapping area 7, 8 of two adjacent grid areas 4, 5, 6, 9, 10, 11, as already mentioned above, is preferably between 1 and 90%, in particular between 3 and 80%, particularly preferably between 1-25% or 5-10%, with respect to the size of a grid area 4, 5, 6, 9, 10, 11.

Partially overlapping grid areas can be covered with different colors. For example, grid area 4 can be covered with a fluorescent red, grid area 5 with a fluorescent green and grid area 6 with a fluorescent blue.

If the grid areas 4, 5, 6 are covered with colorants over their entire surface in succession, three layers of the colorants used may overlap in corner areas of the grid areas. Thus the layer sequence red, green, blue can result in a corner intersection area of the grid areas 4, 5, 6, while the layer sequences red and green can result in a side edge intersection area between the grid areas 4 and 5 and the layer sequence green and blue can result in a side edge intersection area between the two grid areas 5 and 6. This type of image transfer to the substrate can also be carried out, for example, using a digitally controlled inkjet printing method.

As an alternative to a full-surface coating of the grid areas 4, 5, 6, 9, 10, 11 carried out in succession, however, only a section of one of the grid areas 4, 5, 6, 9, 10, 11 located outside the overlapping area 7, 8 can be covered with a colorant of a first color and another of the grid areas 4, 5, 6, 9, 10, 11 as well as the overlapping area 7, 8 with a colorant of a second color. Thus, in the corner intersection area of the grid areas 4, 5, 6 as well as in the lateral overlapping areas only a blue color layer, as in the grid area 6, could be applied, while the remaining part of the grid area 4 could be colored red and the remaining part of the grid area 5 could be colored green. For the embodiment example described in this paragraph, an intaglio printing process is particularly suitable, whereby an intaglio printing cylinder can be used, the cells of which are formed according to the contour of the grid areas 4, 5, 6, 9, 10, 11, taking into account the overlapping areas 7, 8.

It applies for all embodiments described above, that adjacent and partially overlapping grid areas 9, 10, 11 can also be covered with a colorant of the same color, for example a fluorescent blue, red or green in partial areas of the image 2.

To produce the image 2 shown in FIG. 1, a character or a sequence of characters 3 may be applied to the substrate. The characters may be, for example, alphanumeric characters and/or icons, such as hieroglyphics and the like, and/or geometric FIGURES and/or symbols. Each character 3 may additionally be surrounded by a colored area.

At least some of the grid areas 4, 5, 6, 9, 10, 11 can also be coated partially or completely and/or in overlapping areas 7, 8 with adjacent grid areas 4, 5, 6, 9, 10, 11 with two or more layers of colorants of different colors. With this embodiment, a continuous color gradient can be achieved in the individual characters 3. The character 3 or the sequence of characters, as well as any surrounding colored areas, are divided into the grid areas. In addition, geometric area coverage of the colorants used in the image 2 can vary. For example, in one grid area of the grid areas 4, 5, 6, 9, 10, 11, at least a first layer of a first color and at least a second layer of a second color may be applied there over, the second layer covering a first surface area, for example 20%, of the first layer. In another grid area of the grid areas 4, 5, 6, 9, 10, 11, two corresponding layers of the first and the second color may also be applied, the second layer covering a second surface area of a different size, for example 10%, of the first layer. The area coverages in the grid areas 4, 5, 6, 9, 10, 11 are selected here in such a way that the desired color impression or color gradient is achieved in the image 2.

Furthermore, as an alternative or in addition to varying the geometric area coverage, the thickness of the layers applied one on top of the other can also be varied in order to achieve the desired color impression. Thus, in a first grid area of the grid areas 4, 5, 6, 9, 10, 11, a first layer may have a first thickness and a second layer located thereunder may have a second thickness, while, for example, in another grid area of the grid areas 4, 5, 6, 9, 10, 11, a first or second layer may be thicker or thinner than the corresponding first or second layer of the first grid area.

The colorants can, for example, be applied in layers overlapping in the grid areas 4, 5, 6, 9, 10, 11 in such a way that at least one sequence of colors in the image 2, e.g. in the sequence of characters 3 and/or a colored area surrounding them, corresponds to the sequence of colors of a rainbow. Preferably, colors of the RGB color space are used here. For the production of the image 2, for example, an intaglio printing process can be used in which three cylinders are used, each of which successively applying a colorant of one color to the substrate. Thus, one of the cylinders can apply a colorant of red color, another cylinder can apply a colorant of green color, and yet another cylinder can apply a colorant of blue color. The colorants are filled into cells of the cylinders in a manner known per se, and excess color is wiped off from the webs of the cylinders located between the cells. The outlines of the cells can define the grid areas 4, 5, 6, 9, 10, 11—this connection applies generally to all embodiments of the invention in which an intaglio printing process is used. The cylinders are coordinated with one another in such a way that the desired coverage with colorant or the desired color gradient on the substrate is achieved. The solution according to the invention makes it possible to display characters with any color gradient, for example a continuous color gradient.

A sequence of colors in the at least one character 3 or in the one sequence of characters may also be opposite to a sequence of colors in the colored area.

Finally, for the sake of order, it should be noted that, for a better understanding of the layout, elements have been shown partially out of scale and/or enlarged and/or reduced in size.

LIST OF REFERENCE SIGNS

1 Security feature
2 Image
3 Substrate
4 Grid area
5 Grid area
6 Grid area
7 Overlapping area
8 Overlapping area
9 Grid area
10 Grid area
11 Grid area

The invention claimed is:

1. A method for producing a security feature (1) in the form of a colored image (2), comprising the steps of:

subdividing the image into grid areas of a same size, shape and orientation such that immediately adjacent grid areas (4, 5, 6, 9, 10, 11) of the same size, shape and orientation of the image (2) partially overlap, wherein an overlapping area (7, 8) of immediately adjacent grid areas (4, 5, 6, 9, 10, 11) is smaller than one of the grid areas (4, 5, 6, 9, 10, 11), assigning at least one color to each of the grid areas (4, 5, 6, 9, 10, 11) of the image (2), covering with at least one colorant of the respectively assigned color at least the areas of the substrate (3) corresponding to the respective grid areas (4, 5, 6, 9, 10, 11) minus the corresponding overlapping areas (7, 8), and covering the overlapping areas (7, 8) between adjacent grid areas (4, 5, 6, 9, 10, 11) with the colorant having the color assigned to one of the grid areas (4, 5, 6, 9, 10, 11) overlapping in the respective overlapping areas (7, 8), wherein either i) additive color mixing of the colorant covering the adjacent grid areas (4, 5, 6, 9, 10, 11) and the respective overlapping areas (7, 8) takes place, wherein a part of the grid areas (4) is covered at least partially with red color and a part of the grid areas (5) of the image (2) is covered at least partially with green color and a part of the grid areas (6) of the image (2) is covered at least partially with blue color, wherein the colorants are fluorescent in UV-light, and wherein in an overlapping area of three grid areas of different colors, the colors red, green and blue are applied one upon another, or ii) the overlapping areas are covered with only one colorant layer, which corresponds to the colorant layer covering one of the adjacent grid areas.

2. The method according to claim 1, wherein the image (2) is divided in at least one partial area into at least two partially overlapping grid areas (4, 5, 6, 9, 10, 11), at least one of the at least two grid areas (4, 5, 6, 9, 10, 11) being covered, at least outside the overlapping area (7, 8), with a colorant having a color different from the color of the colorant covering the other of the at least two grid areas (4, 5, 6, 9, 10, 11).

3. The method according to claim 1, wherein the colorant is transferred to the substrate by means of an intaglio printing process.

4. The method according to claim 1, wherein at least one character (3), in particular an alphanumeric character (3) and/or an icon and/or a geometric figure and/or a symbol, or a sequence of characters is applied to produce the image (2).

5. The method according to claim 4, wherein a colored area is at least partially generated around the at least one character (3) or the at least one sequence of characters by applying one or more colorants to grid areas (4, 5, 6, 9, 10, 11) surrounding the character (3).

6. The method according to claim 5, wherein a sequence of colors in the at least one character (3) or in the at least one sequence of characters is applied in the opposite direction to a sequence of colors in the colored area.

7. The method according to claim 1, wherein the colorants are applied overlapping in layers so that at least one sequence of colors in the image (2) corresponds to the sequence of colors of a rainbow or a multicolor gradient.

8. A security feature in the form of a colored image (2), wherein the security feature is produced by the method according to claim 1 and the image is divided into colored grid areas (4, 5, 6, 9, 10, 11) of a same size, shape and orientation, adjacent grid areas (4, 5, 6, 9, 10, 11) of the same size, shape and orientation of the image partially overlapping and an overlapping area (7, 8) of adjacent grid areas (4, 5, 6) being smaller than one of the grid areas (4, 5, 6, 9, 10, 11) per se, wherein at least one color is assigned to each of the grid areas of the image and at least the areas of the substrate corresponding to the respective grid areas minus the corresponding overlapping areas are covered with at least one colorant of the respectively assigned color, wherein the overlapping areas between adjacent grid areas are covered with the colorant having the color assigned to one of the grid areas overlapping in the respective overlapping areas, wherein either i) the colorant covering the adjacent grid areas (4, 5, 6, 9, 10, 11) and the respective overlapping areas (7, 8) are subject to additive color mixing, wherein a part of the grid areas (4) is covered at least partially with red color and a part of the grid areas (5) of the image (2) is covered at least partially with green color and a part of the grid areas (6) of the image (2) is covered at least partially with blue color, and wherein the colorants are fluorescent in UV-light, and wherein in an overlapping area of three grid areas of different colors, the colors red, green and blue are applied one upon another, or ii) the overlapping areas are covered with only one colorant layer, which corresponds to the colorant layer covering one of the adjacent grid areas.

9. The security feature according to claim 8, wherein an image (2) comprises, at least in a partial area, at least two overlapping grid areas (4, 5, 6, 9, 10, 11), at least one of the grid areas (4, 5, 6, 9, 10, 11) being covered, at least outside the overlapping area, with a colorant having a color different from that of the colorant covering the other of the at least two grid areas (4, 5, 6, 9, 10, 11).

10. The security feature according to claim 8, wherein that a first grid area (4) of the image (2) is at least partially covered with red color and/or a second grid area (5) of the image (2) is at least partially covered with green color and/or a third grid area (6) of the image (2) is at least partially covered with blue color.

11. The security feature according to claim 8, wherein the overlapping area (7, 8) of two adjacent grid areas (4, 5, 6, 9, 10, 11) of the image (2) is between 1% and 90% with respect to the size of a grid area (4, 5, 6, 9, 10, 11).

12. The security feature according to claim 8, wherein the colorant is a fluorescent colorant, in particular a colorant that fluoresces in UV light.

13. The security feature according to claim 8, wherein the image (2) comprises a portrait, a landscape, an abstract geometric sign, a logo or an alphanumeric sign and/or an icon and/or a coding and/or a sequence of characters.

14. The security feature according to claim 8, wherein a colored surface is arranged at least partially around the at least one character (3) or the at least one sequence of characters.

15. The security feature according to claim 8, wherein a sequence of colors in the at least one character (3) or in the at least one sequence of characters is applied in the opposite direction to a sequence of colors in the colored area.

16. The security feature according to claim 15, wherein the colorants are applied overlapping in layers so that at least one sequence of colors in the image corresponds to the sequence of colors of a rainbow or a multicolor gradient.

17. A security element in the form of a security strip, wherein the security element has the security feature (1) according to claim 8.

18. A value document comprising the security element according to claim 17.

19. A value document comprising the security feature according to claim 8.

20. A method for producing a security feature (1) in the form of a colored image (2), comprising the steps of:

subdividing the image into grid areas of a same size and shape such that immediately adjacent grid areas (4, 5, 6, 9, 10, 11) of the same size and shape of the image (2) partially overlap, wherein an overlapping area (7, 8) of immediately adjacent grid areas (4, 5, 6, 9, 10, 11) is smaller than one of the grid areas (4, 5, 6, 9, 10, 11), wherein each grid area has the shape of a triangle, assigning at least one color to each of the grid areas (4, 5, 6, 9, 10, 11) of the image (2), covering with at least one colorant of the respectively assigned color at least the areas of the substrate (3)

corresponding to the respective grid areas (4, 5, 6, 9, 10, 11) minus the corresponding overlapping areas (7, 8), and covering the overlapping areas (7, 8) between adjacent grid areas (4, 5, 6, 9, 10, 11) with the colorant having the color assigned to one of the grid areas (4, 5, 6, 9, 10, 11) overlapping in the respective overlapping areas (7, 8), wherein either i) additive color mixing of the colorant covering the adjacent grid areas (4, 5, 6, 9, 10, 11) and the respective overlapping areas (7, 8) takes place, wherein a part of the grid areas (4) is covered at least partially with red color and a part of the grid areas (5) of the image (2) is covered at least partially with green color and a part of the grid areas (6) of the image (2) is covered at least partially with blue color, wherein the colorants are fluorescent in UV-light, and wherein in an overlapping area of three grid areas of different colors, the colors red, green and blue are applied one upon another, or ii) the overlapping areas are covered with only one colorant layer, which corresponds to the colorant layer covering one of the adjacent grid areas.

21. A security feature in the form of a colored image (2), wherein the security feature is produced by the method according to claim 20 and the image is divided into colored grid areas (4, 5, 6, 9, 10, 11) of a same size and shape, adjacent grid areas (4, 5, 6, 9, 10, 11) of the same size and shape of the image partially overlapping and an overlapping area (7, 8) of adjacent grid areas (4, 5, 6) being smaller than one of the grid areas (4, 5, 6, 9, 10, 11) per se, wherein each grid area has the shape of a triangle, wherein at least one color is assigned to each of the grid areas of the image and at least the areas of the substrate corresponding to the respective grid areas minus the corresponding overlapping areas are covered with at least one colorant of the respectively assigned color, wherein the overlapping areas between adjacent grid areas are covered with the colorant having the color assigned to one of the grid areas overlapping in the respective overlapping areas, wherein either i) the colorant covering the adjacent grid areas (4, 5, 6, 9, 10, 11) and the respective overlapping areas (7, 8) are subject to additive color mixing, wherein a part of the grid areas (4) is covered at least partially with red color and a part of the grid areas (5) of the image (2) is covered at least partially with green color and a part of the grid areas (6) of the image (2) is covered at least partially with blue color, and wherein the colorants are fluorescent in UV-light, and wherein in an overlapping area of three grid areas of different colors, the colors red, green and blue are applied one upon another, or ii) the overlapping areas are covered with only one colorant layer, which corresponds to the colorant layer covering one of the adjacent grid areas.

22. A security element in the form of a security strip, wherein the security element has the security feature (1) according to claim 21.

23. A value document comprising the security element according to claim 22.

24. A value document comprising the security feature according to claim 21.

25. A method for producing a security feature (1) in the form of a colored image (2), comprising the steps of:

subdividing the image into grid areas of a same size and shape such that immediately adjacent grid areas (4, 5, 6, 9, 10, 11) of the same size and shape of the image (2) partially overlap, wherein an overlapping area (7, 8) of immediately adjacent grid areas (4, 5, 6, 9, 10, 11) is smaller than one of the grid areas (4, 5, 6, 9, 10, 11), wherein the overlapping area (7, 8) of immediately adjacent grid areas is 1-25% with respect to the size of one of the grid areas, assigning at least one color to each of the grid areas (4, 5, 6, 9, 10, 11) of the image (2), covering with at least one colorant of the respectively assigned color at least the areas of the substrate (3) corresponding to the respective grid areas (4, 5, 6, 9, 10, 11) minus the corresponding overlapping areas (7, 8), and covering the overlapping areas (7, 8) between adjacent grid areas (4, 5, 6, 9, 10, 11) with the colorant having the color assigned to one of the grid areas (4, 5, 6, 9, 10, 11) overlapping in the respective overlapping areas (7, 8), wherein either i) additive color mixing of the colorant covering the adjacent grid areas (4, 5, 6, 9, 10, 11) and the respective overlapping areas (7, 8) takes place, wherein a part of the grid areas (4) is covered at least partially with red color and a part of the grid areas (5) of the image (2) is covered at least partially with green color and a part of the grid areas (6) of the image (2) is covered at least partially with blue color, wherein the colorants are fluorescent in UV-light, and wherein in an overlapping area of three grid areas of different colors, the colors red, green and blue are applied one upon another, or ii) the overlapping areas are covered with only one colorant layer, which corresponds to the colorant layer covering one of the adjacent grid areas.

26. A security feature in the form of a colored image (2), wherein the security feature is produced by the method according to claim 25 and the image is divided into colored grid areas (4, 5, 6, 9, 10, 11) of a same size and shape, adjacent grid areas (4, 5, 6, 9, 10, 11) of the same size and shape of the image partially overlapping and an overlapping area (7, 8) of adjacent grid areas (4, 5, 6) being smaller than one of the grid areas (4, 5, 6, 9, 10, 11) per se, wherein the overlapping area (7, 8) of immediately adjacent grid areas is 1-25% with respect to the size of one of the grid areas, wherein at least one color is assigned to each of the grid areas of the image and at least the areas of the substrate corresponding to the respective grid areas minus the corresponding overlapping areas are covered with at least one colorant of the respectively assigned color, wherein the overlapping areas between adjacent grid areas are covered with the colorant having the color assigned to one of the grid areas overlapping in the respective overlapping areas, wherein either i) the colorant covering the adjacent grid areas (4, 5, 6, 9, 10, 11) and the respective overlapping areas (7, 8) are subject to additive color mixing, wherein a part of the grid areas (4) is covered at least partially with red color and a part of the grid areas (5) of the image (2) is covered at least partially with green color and a part of the grid areas (6) of the image (2) is covered at least partially with blue color, and wherein the colorants are fluorescent in UV-light, and wherein in an overlapping area of three grid areas of different colors, the colors red, green and blue are applied one upon another, or ii) the overlapping areas are covered with only one colorant layer, which corresponds to the colorant layer covering one of the adjacent grid areas.

27. A security element in the form of a security strip, wherein the security element has the security feature (1) according to claim 26.

28. A value document comprising the security element according to claim 27.

29. A value document comprising the security feature according to claim 26.

* * * * *